Patented Apr. 21, 1931

1,801,677

UNITED STATES PATENT OFFICE

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY

PROCESS OF PRODUCING AMMONIUM SULPHATE NITRATE

No Drawing.   Application filed December 7, 1928.   Serial No. 324,587.

Ammonium nitrate is too hygroscopic or capable of absorbing moisture from the atmosphere for direct use as a fertilizer ingredient or constituent.

A double salt of ammonium sulphate and ammonium nitrate is known to the fertilizer industry, and it is less hygroscopic than straight ammonium nitrate, and is, therefore, more readily usable under many conditions as a fertilizer material.

Such salt contains about twenty-six and one-half (26.5%) per cent. nitrogen of which approximately one-fourth (¼) is in the form of oxidized nitrogen and the remainder ammoniacal.

I have discovered that it is possible and feasible to prepare this double salt by oxidizing ammonia with an excess of air by the use of a platinum-gauze catalyst heated electrically or otherwise to the proper temperature of about six hundred (600°) to eight hundred (800°) degrees centigrade and utilizing the oxides of nitrogen so produced directly in the production of the double salt referred to.

The oxides of nitrogen, together with an excess of air, pass through absorption towers, through which sulfuric acid circulates until the nitric acid content of the sulfuric acid is built up or increased to the desired quantity, this amount being preferably such that about one-fourth (¼) of the nitrogen in the finished product is in the oxidized form, and the mixed acids thus formed are then substantially neutralized with ammonia in an ordinary ammonium-sulphate saturator, or in any other approved manner, so that there are two molecules of ammonia added for every molecule of sulfuric acid and one molecule of ammonia for each molecule of nitric or nitrous acid, the double salt being produced, as will be readily understood, by reason of such neutralization.

The sulfuric acid employed is desirably used as strong as reasonable because it absorbs readily and requires less evaporation, so that the strongest acid from the chamber system, such as sixty (60°) degrees Baumé, would be used, unless stronger acids from a contact plant were available.

It is also possible to prepare this double salt by passing oxides of nitrogen, excess air and ammonia gas directly into sulfuric acid circulating countercurrent in the absorbing towers, and the solution so formed may be then evaporated to produce the double salt.

Precautions should be taken to condense any fumes escaping from these towers by the use of a Cottrell precipitator or by the employment of some form of filter.

The present invention, as defined by the appended claims, is not necessarily limited to the precise and exact details set forth, and these may be modified within a reasonable range without departure from the principles of the invention and without the loss of any of its inherent advantages.

I claim:

1. The process of manufacturing ammonium sulphate nitrate consisting in passing oxides of nitrogen and air countercurrent to a flow of sulfuric acid to form a mixture of acids, and then substantially neutralizing such mixed acids with ammonia.

2. The process of making ammonium sulphate nitrate consisting in directly introducing oxides of nitrogen, air and ammonia into sulfuric acid.

3. The process of manufacturing ammonium sulphate nitrate consisting in bringing sulfuric acid into contact with oxides of nitrogen and with air, and substantially neutralizing with ammonia the mixed acids thus formed.

In witness whereof I have hereunto set my hand.

HERBERT H. MEYERS.